United States Patent [19]

Elliott

[11] 4,328,575

[45] May 4, 1982

[54] DISC PLAYER HAVING TURNTABLE HEIGHT VARYING APPARATUS

[75] Inventor: Charles A. Elliott, Indianapolis, Ind.

[73] Assignee: RCA Corporation, New York, N.Y.

[21] Appl. No.: 148,467

[22] Filed: May 9, 1980

[51] Int. Cl.³ .............................................. G11B 3/60
[52] U.S. Cl. ................................................... 369/269
[58] Field of Search ................................ 369/269–271

[56] References Cited

U.S. PATENT DOCUMENTS

| | | | |
|---|---|---|---|
| 2,207,251 | 7/1940 | Guedon | 369/270 X |
| 3,058,790 | 10/1962 | Hammerand | 369/269 |
| 3,103,364 | 9/1963 | Macks et al. | 369/269 X |

FOREIGN PATENT DOCUMENTS 1272154 of 1960 France ................................. 33/269

Primary Examiner—Charles E. Phillips
Attorney, Agent, or Firm—E. M. Whitacre; J. S. Tripoli; D. A. Kulkarni

[57] ABSTRACT

In a record player, one end of a tubular shaft is attached to a turntable. A follower member is disposed within the tubular shaft near the free end thereof such that a portion of the follower member extends beyond the shaft for engagement with the base of the player. The follower member is captured in the tubular shaft, but is free to float up and down. Disposed inside the tubular shaft is a threaded cap on which the follower member rides. The threaded cap is provided with a hex socket which is accessible from the top of the turntable through a central opening therein. A hex wrench is inserted through the tubular shaft and the cap is turned to adjust the turntable height.

2 Claims, 8 Drawing Figures

DISC PLAYER HAVING TURNTABLE HEIGHT VARYING APPARATUS

This invention relates to disc record players, and more particularly, to a video disc type record player.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type pickup system is illustratively disclosed in U.S. Pat. No. 3,842,194 (Clemens).

In such systems, the player typically includes a turntable for centering and rotatably supporting a video disc. The pickup stylus is disposed at one end of a stylus arm. The other end of the stylus arm is supported by a compliant coupler in a metal carriage. Disposed in the bottom wall of the carriage is an opening through which the stylus is selectively lowered for record engagement. During playback, the carriage is translated along parallel guideways across a turntable-supported record in correlation with the radial motion of the track-following stylus.

To protect the video disc record, it is beneficial to enclose it in a caddy which comprises an outer jacket and an inner spine. For record loading, a full caddy is inserted into an input slot provided in the player. A record extraction mechanism disposed in the player removes the record/spine assembly from the jacket in order to retain it in the player during subsequent jacket withdrawal. The retained record/spine assembly is supported in the player on a set of receiving pads. To transfer the record to the turntable for playback, the turntable is raised relative to the receiving pads. The record player is provided with a set of hold-down members which hold the retained spine in place while allowing the retained record to be picked up by the turntable when it is raised. To unload the retained record, the record is transferred back to the receiving pads by lowering the turntable to form the record/spine assembly. An empty jacket is inserted into the player, whereby the record/spine assembly is returned back into the jacket. The caddy is then withdrawn from the player. Reference is made to U.S. patent application, Ser. No. 964,531, entitled "VIDEO DISC PLAYER", and filed in the name of Torrington, now U.S. Pat. No. 4,196,906, for an example of such player.

In the systems of the type mentioned above, the spacing between the carriage and the turntable-supported record is critical. The record/carriage spacing defines the attitude of the stylus electrode with respect to the record, which, in turn, has bearing on signal reproduction. Moreover, the record/carriage spacing determines the capacitance between the conductive property of the record and the metal carriage, which is disposed at ground potential. The record/carriage capacitance defines the electrical return path of the pickup circuits, and, therefore, affects the playback operations.

Furthermore, the height at which the turntable is disposed in the player is also critical for proper operation of other related player mechanisms. For example, the turntable must have precise relationship with the receiver pads, in the raised and the lowered position of the turntable, to assure transfer of the retained record between the turntable and the receiver pads.

Additionally, important considerations in the design of the player are manufacturability of its components, ease of assembly and reduction of cost of the player. To this end, it is desirable to relax mechanical tolerances on player components. The relaxation of mechanical tolerances causes tolerance buildup which must be compensated.

In accordance with this invention, an apparatus is provided for varying the height of the turntable.

Pursuant to a further feature of the invention, the turntable has a central aperture through which access is provided to the turntable height varying apparatus. In the drawings.

Figure 1:
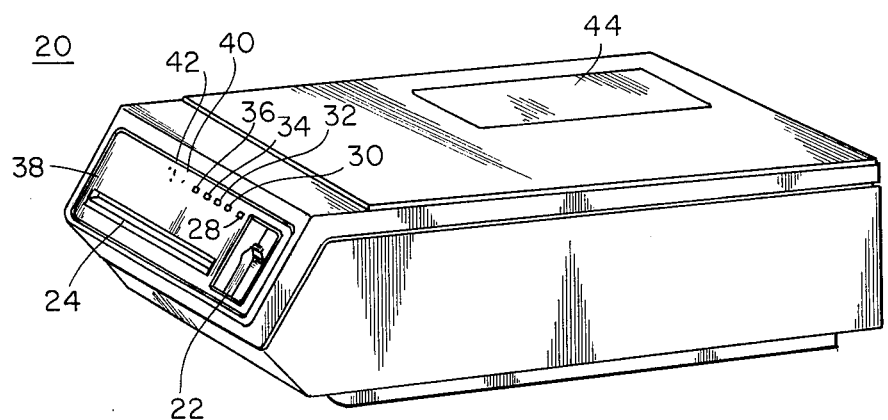
FIG. 1 shows a video disc player incorporating the turntable height varying apparatus according to the instant invention.
Figure 3:
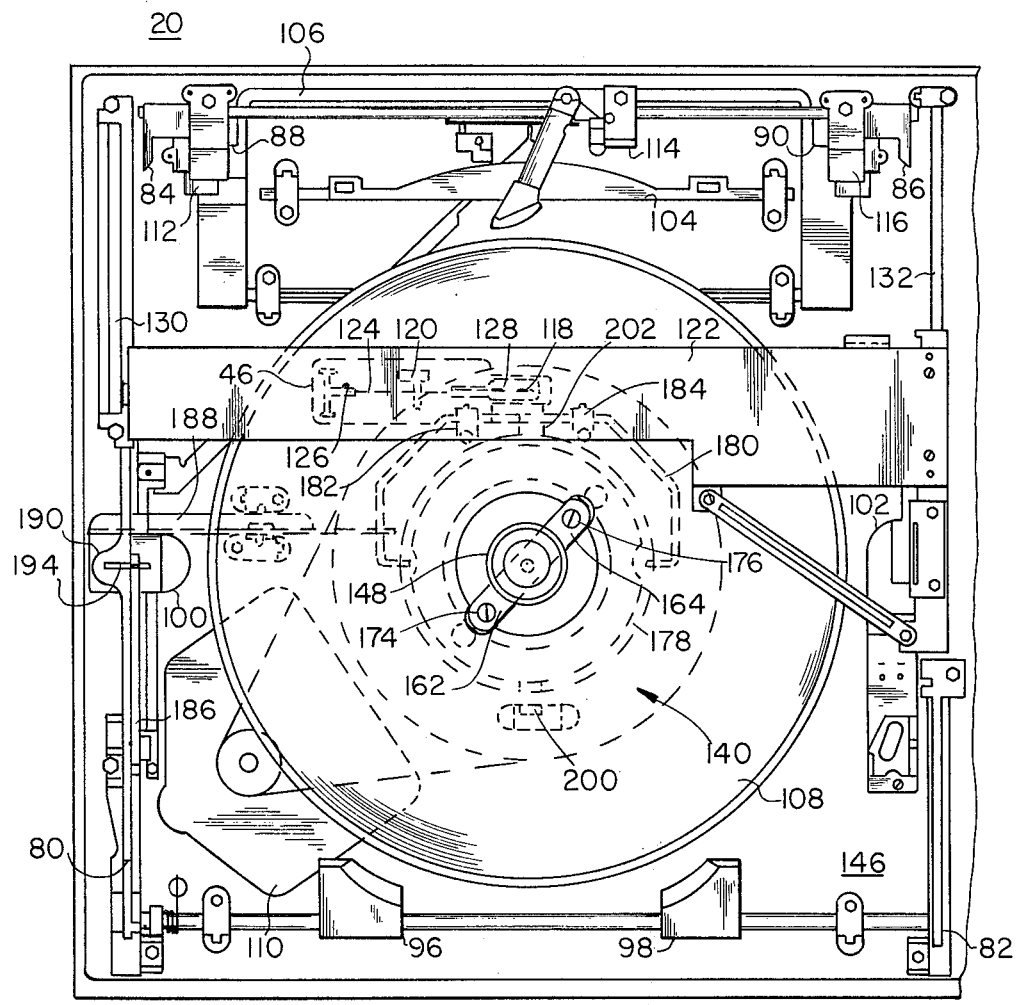
Figure 5:
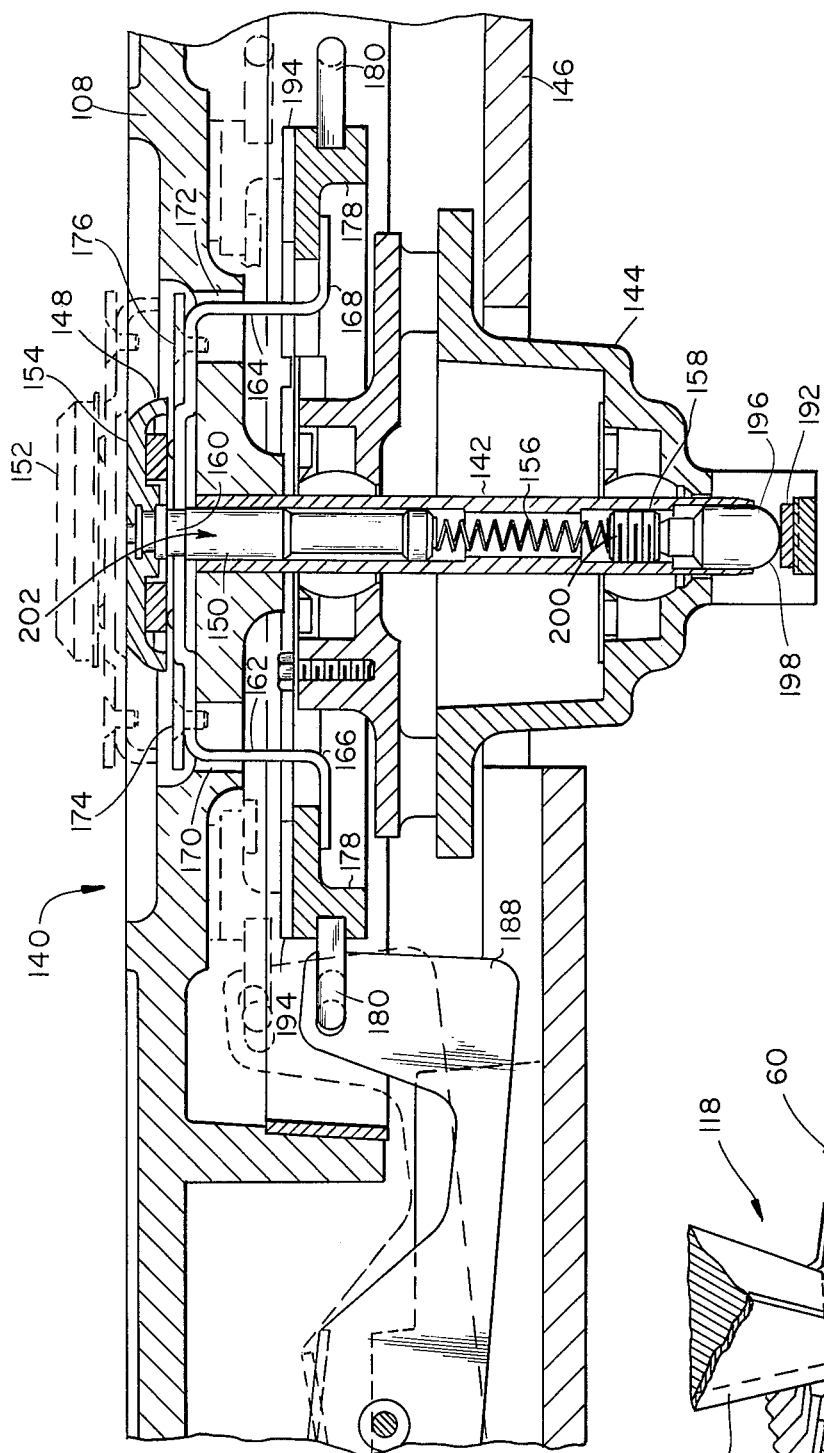
Figure 4:
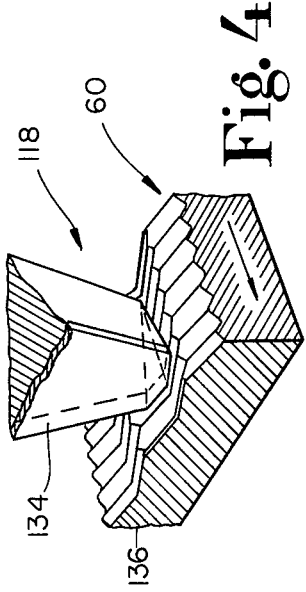
Figure 7:
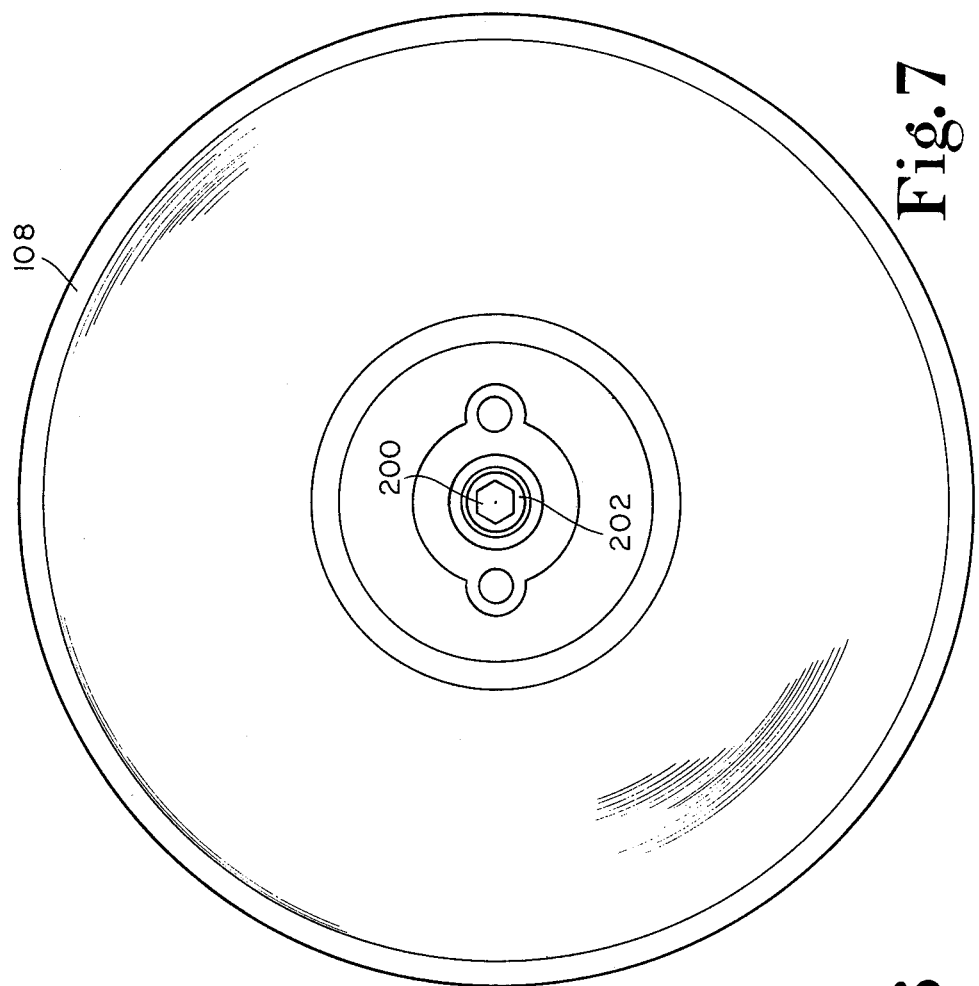
Figure 6:
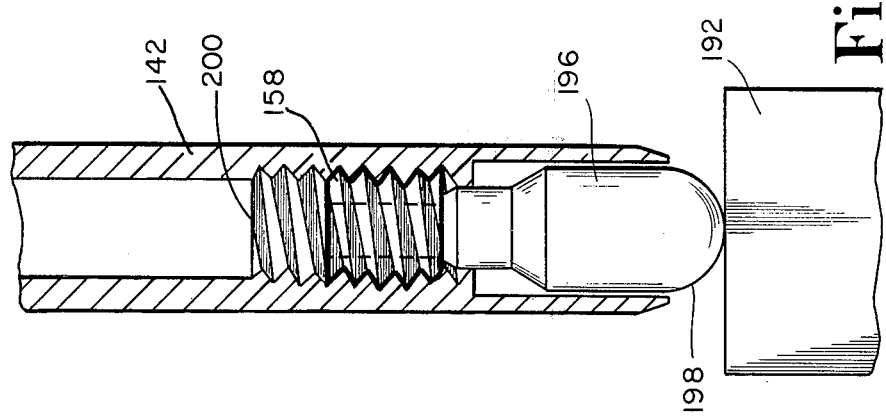
Figure 8:
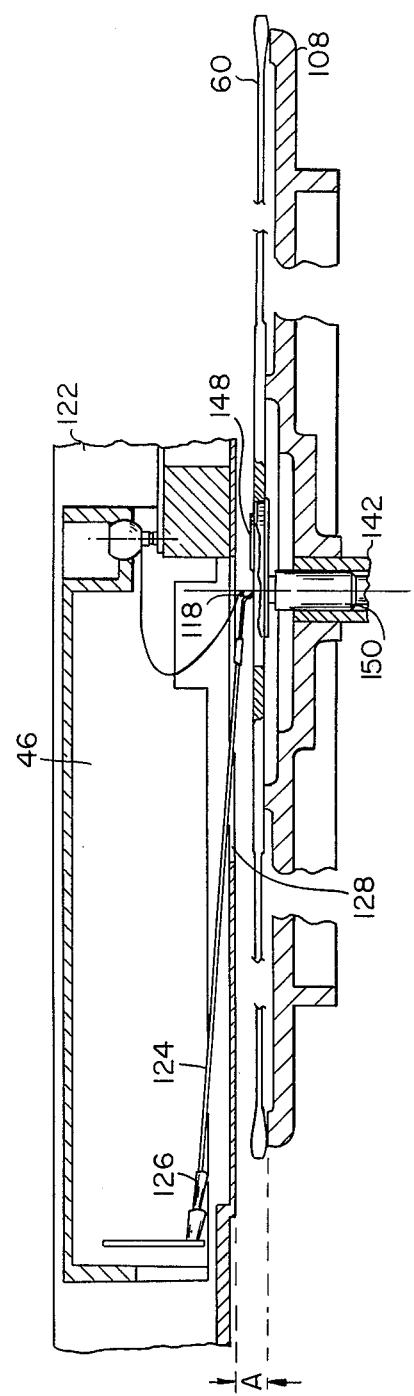

FIG. 3 provides a plan view of the player of FIG. 1;

FIG. 4 illustrates the capacitance pickup concept employed in the player of FIG. 1;

FIG. 5 represents a sectional view of the subject turntable height varying apparatus; and FIGS. 6–8 show various details of the turntable height varying apparatus of FIG. 5.

Shown in FIG. 1 is a video disc player 20 having the subject turntable height varying apparatus. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., fast forward/reverse and scan forward/reverse. A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". An access door 44 is disposed on the cover of the player to provide access to a stylus cartridge 46 (FIG. 3).

Figure 2:
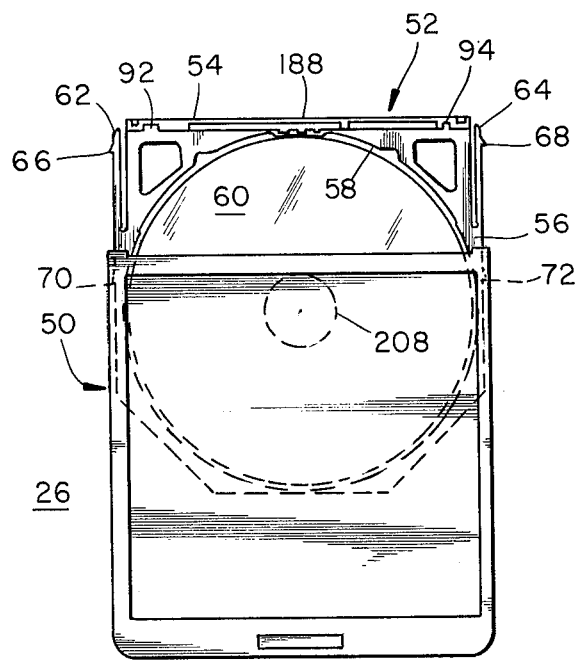
FIG. 2 illustrates a video disc caddy suitable for use with the player of FIG. 1.

As shown in FIG. 2, the video disc caddy 26, suitable for use with the player of FIG. 1, comprises an outer jacket 50 having an edge opening and a substantially planar, inner spine 52. The spine 52 has a portion 54 which serves as a closure when the spine is fully inserted into the jacket, and a further portion 56 having a circular opening 58 for receiving a record 60. The spine 52 is further provided with integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for locking the spine 52 in place when it is fully inserted therein.

The operation of the caddy extraction mechanism will be first explained in conjunction with FIG. 3. To load a record into the player, a caddy is inserted into the input slot 24 along a path defined by guideways 80 and 82. As the caddy arrives at a fully inserted position in the player, latch defeat members 84 and 86 enter the jacket 50 to defeat the spine latch fingers 62 and 64 for freeing the spine 52 from the jacket. Pivotally mounted in the player are spine gripper members 88 and 90 which are received in cutouts 92, and 94, arranged in the spine 52, when the caddy arrives at the fully inserted position in the player in order to lock the spine to the player. Since the spine 52 is released from the jacket 50 through the operation of the latch defeat members 84 and 86 and latched to the player through the operation of the spin gripper members 88 and 90, subsequent withdrawal of the jacket leaves the record/spine assembly in the player. The spring-loaded receiver pads 96, 98, 100, 102 and 104 serve to accurately locate the retained spine/record assembly in the player. A pair of springs (not shown) disposed between a gripper arm 106, which carries the spine gripper members 88 and 90, and the latch defeat members 84 and 86 effect downward deflection of the latch defeat members during jacket withdrawal.

To transfer the retained record to a turntable 108, the function lever 22 is moved to the PLAY position, which, in turn, raises the turntable and starts a turntable motor 110. A set of hold-down members 112, 114 and 116 hold the retained spine 52 in place against the receiver pads 96–104 while permitting the retained record to be picked up by the turntable 108 when it is raised. The hold-down members 112–116 also serve to accurately locate the retained spine 52, longitudinally and laterally, in the player. A pickup stylus 118 is gently lowered onto the information track disposed on the record by means of a stylus lifter 120 (for example, of the type described in U.S. Pat. No. 4,053,161) mounted in a metal carriage 122. The pickup stylus 118 is disposed at one end of a stylus arm 124. The other end of the stylus arm 124 is secured to the cartridge 46 by means of a rubber coupler 126. Disposed in the bottom wall of the carriage 122 is an opening 128 through which the stylus 112 is selectively lowered for record engagement. During playback, the carriage 110 is translated on guiderails 130 and 132 disposed parallel to the caddy guideways 80 and 82 from a starting position at the back of the player toward the front of the player in correlation with the radially inward motion of the pickup stylus 118 and in a direction disposed opposite to the direction of insertion of the caddy into the player. The variations in capacitance between an electrode 134 carried by the stylus 118 and a conductive property 136 of the record 60 are sensed to reproduce the stored information on the record. (See FIG. 4.) The reproduced signals are processed to reconstruct a standard television signal containing picture and sound information for application to a television receiver.

To transfer the record back to the receiver pads 96–104, the function lever 22 is shifted back to the LOAD/UNLOAD position, which, in turn, lowers the turntable 108 to a level below the receiver pads. When the turntable 108 is lowered, the record, which is still spinning, is deposited on the receiver pads 96–104 for reception in the opening 58 disposed in the spine 52. The turntable motor 110 is shut off when the function lever 22 is displaced to the LOAD/UNLOAD position. To retrieve the record/spine assembly, the empty jacket 50 is inserted into the player through the input slot 24 along the guideways 80 and 82. As the jacket 50 arrives at the fully inserted position in the player, the front edge thereof engages the already deflected latch defeat members 84 and 86 to cause further downward deflection thereof. Such further downward deflection of the latch defeat members 84 and 86, in turn, effect downward displacement of the spine gripper members 88 and 90, whereby the spine 52 is freed from the player. When the jacket 50 is fully inserted into the player, the spine latch fingers 62 and 64 snap back into the pockets 70 and 72 to lock the spine 52 to the jacket. The record/spin assembly is withdrawn from the player when the caddy is extracted.

As previously indicated, when the turntable 108 is depressed to deposit the record onto the receiver pads 96–104, the record, which is still spinning, has a tendency to mislocate with respect to the opening 58 in the spine 52 disposed on the receiver pads, thereby preventing proper reception of the record in the spine. A mechanism 140 employed to prevent record/spine misalignment will now be described in conjunction with FIG. 5.

The turntable 108 is secured to a tubular shaft 142 which is journalled for rotation and translation in a bearing housing 144 fixedly mounted to the base plate 146 of the player. A record centering spindle 148 is disposed on a pin 150 which is received in the central opening of the turntable shaft 142. It will be seen that the spindle 148 is arranged coaxially with the turntable 108, and is subject to rotational and translational motion independent of the turntable. The raised position 152 and the depressed position 154 of the spindle 148 are respectively shown by the dotted lines and the solid lines in FIG. 5. A bias spring 156, arranged between the spindle pin 150 and a threaded cap 158 disposed in the turntable shaft 142, urges the spindle 148 toward the raised position 152.

Disposed on the spindle pin 150 is a circumferential groove defining a neck portion 160 which is received in an aperture defined by a pair of yokes 162 and 164. The leg portions 166 and 168 of the yokes 162 and 164 are threaded through holes 170 and 172 in the turntable 108, and the yokes are secured to each other by means of screws 174 and 176. The terminal portions of the yokes 162 and 164 are received underneath a pull-down ring 178. The pull-down ring 178 is pivotally mounted on a C-shaped frame 180 which, in turn, is pivotally secured to the base plate 146 of the player by means of a pair of posts 182 and 184.

As shown in FIG. 3, an actuating cam 186 is pivotally mounted adjacent to the caddy guideway 80 such that the front edge of the caddy 26 engages a portion disposed on the cam 186 to raise the cam as the caddy is inserted into the player. A rocker arm 188, pivotally mounted to the base plate 146 of the player, has its one end connected to the C-shaped frame 180 and its other end secured to the actuating cam 186 by means of a connecting link. A return spring, arranged between a boss 190 disposed on the caddy guideway 80 and the rocker arm 188, serves to bias the actuating cam such that it is normally disposed in the caddy insertion path. When the caddy 26 is inserted into the player, the actuating cam 186 is lifted out of the caddy insertion path. When the actuating cam 186 is lifted, the pull-down ring 178 is depressed and the spindle 148 is retracted.

The operation of the mechanism 140 will now be explained. When the record/spine assembly is loaded into the player, it rests on the receiver pads 96–104. The turntable 108 is raised by displacing the function lever 22 to the PLAY position to deposit the record on the turntable. The mechanism employed for raising and lowering the turntable 108 includes a sliding cam 192 shown in FIG. 5. To initiate the playback sequence, the turntable motor 110 is started, the stylus 118 is lowered onto the record and the carriage 122 is driven to follow the stylus across the record. During playback, the turntable 108 drives the record to rotate at the desired speed (e.g., 450 rpm).

The function lever 22 is shifted back to the LOAD/UNLOAD position to lower the turntable 108 to a position below the level of the receiver pads 96-104 by means of the sliding cam 192. As the turntable 108 is lowered, the record, which is still spinning, is deposited on the receiver pads 96-104. The bias spring 156 urges the spindle 148, which is mounted for relative motion independent of the turntable, to remain in the raised position 152 in engagement with the record center hole. Such record/spindle engagement ensures proper alignment and reception of the record in the opening 58 disposed in the spine 52 and formation of the record/spine assembly. The frictional engagement between the rotating record and the adjacent stationary surfaces decelerates the record. A felt ring 194 disposed on the pull-down ring 178 engages the underside of the turntable 108, as shown in FIG. 5, to bring the turntable to halt.

To retrieve the record/spine assembly, the empty jacket 50 is inserted into the input slot 24 along the caddy guideways 80 and 82. The receiver pads 96-104 accurately align the record/spine assembly with respect to the caddy guideways 80 and 82 to effect return of the record/spine assembly into the jacket 50 as it is inserted into the player. When the jacket 50 is inserted into the player, the front edge 188 of the jacket 50 lifts the actuating cam 186 to, in turn, effect retraction of the spindle 148, whereby the jacket can be inserted into the player free from interference with the spindle. The caddy 26 is, then, withdrawn from the player.

In the player of the type described above, it is desirable to precisely adjust the height of the turntable for the reasons indicated above. The apparatus, in accordance with this invention, for varying the height of the turntable will now be described with reference to FIGS. 5-8. A follower member 196 is disposed within the tubular shaft 142 for motion parallel to the axis of the turntable. A portion 198 of the follower member 196 protrudes beyond the free end of the tubular shaft 142 for engagement with the sliding cam 192. A lubricant, such as grease, prevents the follower member 196 from falling out of the tubular shaft 142 during handling.

A portion of the interior surface of the tubular shaft 142 is provided with threads for engagement with the threaded cap 158. One end of the threaded cap 158 is disposed in engagement with the non-protruding end of the follower member 196. Disposed at the other end of the threaded cap 158 is a hex socket 200 as shown in FIG. 7. After removing the spindle 148, the hex socket 200 is accessible from the top side of the turntable through a central opening 202 provided therein for adjustment of the turntable height. After the turntable 108 is assembled and the pickup carriage 122 is installed, the turntable height is adjusted by inserting a hex wrench through the turntable shaft 142 and turning the threaded cap 158. Illustratively, the spacing between the bottom surface of the carriage 122 and the top surface of the turntable 108, the dimension "A" in FIG. 8, is 0.158±0.010 inches. The spindle 148 is then installed to complete the assembly.

What is claimed is:

1. In a player for recovering prerecorded information from a disc record by means of a pickup; said player including a turntable disposed thereon for centering and rotatably supporting a record for playback; said player further having a carriage for supporting said pickup; said carriage being mounted in said player at a given height for translation over and across a turntable-supported record; apparatus secured to said turntable for varying the height of said turntable with respect to the base of said player over an operating range comprising:

(A) a tubular shaft having one end secured to said turntable such that said shaft is coaxially disposed with respect to said turntable;

(B) a member disposed within said tubular shaft near the free end thereof, and subject to motion along a path disposed parallel to the axis of said turntable; said member having a portion protruding beyond said free end for engagement with said base of said player; and (C) means arranged within said tubular shaft on the side of said member away from said protruding portion thereof for varying the position of said member along said path; said turntable having a central opening in communication with the interior of said tubular shaft for providing access to said position varying means.

2. The apparatus as defined in claim 1 wherein the interior surface of said tubular shaft has a threaded portion; wherein the position varying means comprises a cylindrical element having a threaded peripheral portion arranged for engagement with said threaded portion of said tubular shaft.

* * * * *

UNITED STATES PATENT AND TRADEMARK OFFICE
CERTIFICATE OF CORRECTION

PATENT NO. :   4,328,575
DATED      :   May 4, 1982
INVENTOR(S) :  Charles Anthony Elliott It is certified that error appears in the above—identified patent and that said Letters Patent is hereby corrected as shown below:

Col. 4, line 4, "record/spin" should read --record/spine--.

Signed and Sealed this

Thirty-first Day of August 1982

[SEAL]

Attest:

Attesting Officer

GERALD J. MOSSINGHOFF

Commissioner of Patents and Trademarks